(12) United States Patent
Harand et al.

(10) Patent No.: US 6,643,462 B2
(45) Date of Patent: Nov. 4, 2003

(54) VARIABLE VIEWFINDER FOR WIDE ANGLE SHOTS

(75) Inventors: Bernd Harand, Wetzlar (DE); Antje Brethauer, Wetzlar (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 10/095,707

(22) Filed: Mar. 13, 2002

(65) Prior Publication Data

US 2002/0131777 A1 Sep. 19, 2002

(30) Foreign Application Priority Data

Mar. 14, 2001 (DE) .......................... 101 12 611

(51) Int. Cl.⁷ .............................................. G03B 13/10
(52) U.S. Cl. ....................................................... 396/379
(58) Field of Search ................................. 396/373, 378, 396/379, 380

(56) References Cited

U.S. PATENT DOCUMENTS

| | | | |
|---|---|---|---|
| 4,725,130 A | 2/1988 | Ozawa | 350/427 |
| 4,779,969 A | 10/1988 | Sato et al. | 350/560 |
| 4,948,227 A | 8/1990 | Takeyasu | 350/255 |
| 5,083,146 A | 1/1992 | Ueda | 354/149.1 |
| 5,182,592 A | 1/1993 | Betensky et al. | 354/221 |
| 5,262,898 A | 11/1993 | Nomura | 359/700 |
| 5,335,034 A | 8/1994 | Lewis et al. | 354/219 |
| 6,144,810 A | * 11/2000 | Penkwitt et al. | 396/373 |
| 6,519,420 B1 | * 2/2003 | Yokomae et al. | 396/378 |

FOREIGN PATENT DOCUMENTS

DE 958 980 2/1957

OTHER PUBLICATIONS

"Objecktive," Des Optischen Werkes, 1953.

* cited by examiner

*Primary Examiner*—Christopher Mahoney
(74) *Attorney, Agent, or Firm*—Foley & Lardner

(57) ABSTRACT

A variable viewfinder, for wide-angle camera shots includes three lens units. The first and third lens units, in the light direction, have negative refractive power whereas the second unit has positive refractive power. The lens units are arranged displaceably relative to one another, for changing the viewfinder magnification, in a telescope housing that includes an adaptor for insertion into a flash shoe on the camera. The first and third lens units are fixed in the telescope housing and the second lens unit is arranged in a variator that can be displaced in the telescope housing. The variator includes at least one guide pin which, through a curved track arranged in the telescope housing, engages in a longitudinal groove that runs parallel to the longitudinal axis of the telescope housing. In addition, the variator is provided in a rotating ring pushed onto the telescope housing.

18 Claims, 3 Drawing Sheets

VARIABLE VIEWFINDER FOR WIDE ANGLE SHOTS

CROSS REFERENCE TO RELATED APPLICATIONS

This invention claims priority of German Patent Application DE 101 12 611.5, the entirety of which is incorporated herein by reference, filed Mar. 14, 2001.

BACKGROUND OF THE INVENTION

1. Field of the Invention

The invention relates to a variable viewfinder for wide angle shots.

2. Description of the Related Art

An optical system for a variable viewfinder is described in U.S. Pat. No. 4,725,130 (the "'130 patent") which is incorporated herein by reference. The '130 patent is particularly concerned with compact cameras including photographic cameras and video cameras. These cameras are frequently fitted with zoom lenses that are designed for a relatively limited focal range. The viewfinder magnification is adjusted, by gearing, as a function of the change in the focal length under cam control so that the image field in the viewfinder corresponds to the image field for the shot. Two of the lens units are adjusted relative to a fixed lens unit to adapt the viewfinder magnification. In this process, at least one of the outer lens units is also adjusted so that the overall length of the viewfinder system is changed.

Cameras with a measuring viewfinder and interchangeable lenses of different focal length are usually equipped with a viewfinder of constant magnification that is optimized for a selected lens focal length. When using a lens having a longer (or shorter) focal length, various frames corresponding to the changed image field of the shots are reflected into the viewfinder. As the focal length of the lens increases, the image field, limited by the frame, decreases. Correspondingly, as the focal length decreases, the image field increases until it can no longer be displayed in the viewfinder; the user can then no longer fully observe in the viewfinder the image field taken by the lens.

To remedy this defect, special viewfinders are provided for wide angle lenses. The image fields of wide angle lenses are adapted to the lens and can be pushed, via an adaptor, into the flash shoe on the camera. The basic design of such systems, which are known as Galilean viewfinders, constitutes an inverted Dutch telescope. This design has a divergent lens on the object side which limits the field of view and, therefore, frequently has a shape similar to the picture size; additionally, a mask corresponding to the picture size may be added. A convergent lens acts as an eyepiece. The field of view is a function of the mask size and the ratio of the focal lengths of the two lenses.

The fact that the user has to set the distance, stop, and look into the viewfinder on the camera side results in particular design requirements for the push-on viewfinder. Looking into the camera viewfinder is not to be prevented by the push-on viewfinder. The distance, when switching between looking and not looking into the push-on viewfinder, should not be too large. For the viewfinding magnification to be as large as possible (so as to be able to detect detail effectively), the diameters of the lenses in the front lens unit must be correspondingly large. On the other hand, high speed wide angle lenses have a large diameter which can impede the field of view of the push-on viewfinder when the latter is arranged as close as possible to the camera housing.

As a result of these design-induced stipulations, only special push-on viewfinders have been developed as Galilean viewfinders of simplest design for specific focal lengths. Historically, this was tolerable for the user because the magnification selected for the built-in viewfinder permitted the display of a viewfinder frame for lenses with a focal length of up to, for example, 28 mm. Moreover, use was mostly made only of one further lens of shorter focal length. However, because of better setting accuracy for standard lenses, there is an increasing desire for higher viewfinder magnifications. As a result, the field of view can no longer be displayed for, by way of example, a 28 mm lens. Moreover, owing to modern methods of computation and manufacture, the design of wide angle lenses with shorter focal lengths and higher imaging performance in conjunction with high speed is something which is finding increasing favor among users. However, to achieve such desires, users must use an ever greater number of push-on viewfinders, which increases the likelihood of confusion in assignfment when exchanging lenses and viewfinders.

For these and other reasons, a new apparatus is needed which provides a variable viewfinder which is easy to assemble and attach to a camera and which provides an increased magnification range without increasing the overall size of the viewfinder.

SUMMARY OF THE INVENTION

A first aspect of the invention involves a viewfinder having a variable magnification. The viewfinder includes a telescope housing, a rotating ring, a variator, and first, second, and third lens units. The telescope housing, which may be a cylinder, has an axis which defines a light direction. In addition, the telescope housing includes at least one curved groove formed in a sidewall thereof and an adapter. The rotating ring, which is rotatably connected to the telescope housing, includes at least one longitudinal groove which is substantially parallel to the axis. Similarly, the variator, which is preferably made out of an elastomeric material such as injection-molded plastic, is journalled within the telescope housing and is adapted to move within the telescope housing in the direction of the axis. The variator also includes a plurality of guide pins at least one of which projects through one of the curved grooves and extends into one of the one longitudinal grooves.

The first and third lens units have negative refractive power in the light direction whereas the second lens unit has positive refractive power in that direction. In addition, all three lens units are positioned in the telescope housing, however, only the first and third lens units are fixed relative thereto. The second lens unit, on the other hand, is provided in the variator and is adapted to move with respect to the first and third lens units along the longitudinal axis to change the magnification of the viewfinder. In addition, the adapter is adapted to fit in a shoe of a camera.

In the aforementioned viewfinder, the first lens unit may include a first and a second lens between which is provided a mask which is adapted to limit an image field of the viewfinder. Moreover, the mask may include a position-determining nose that is adapted to engage a cutout in the telescope housing. In addition, the second lens of the first lens unit may rest on a snap ring which is inserted in a circumferential groove in the telescope housing.

The telescope housing is preferably open at one end; the open end being adapted to receive light traveling along the axis. Moreover, the open end may include a holder to maintain the orientation of third lens unit with respect to the telescope housing. Similarly, a holder, which may be provided on a head side of the variator, may maintain the orientation of the second lens unit with respect to the variator. Moreover, a rear side of the variator may include at least one tongue from which the guide pins project in a direction radially away from the axis. Further, the guide pins and the tongues are preferably integrally formed. In addition, sliding surfaces may be provided on an outer surface of the variator.

The adapter preferably includes a ball latch which is adapted to engage releaseably latching notches in the rotating ring. In addition, the telescope housing preferably includes a holder adapted to receive a supplementary lens.

In the previously described viewfinder, the focal lengths of the three lens units are such that the diopter of the viewfinder, over a focusing range, lies in a range that a human eye can accommodate. Moreover, the viewfinder diopter, over the focusing range, is preferably between −0.5 and −1.0.

These and other features, aspects, and advantages of the present invention will become more apparent from the following description, appended claims, and accompanying exemplary embodiments shown in the drawings.

BRIEF DESCRIPTION OF THE DRAWINGS

The accompanying drawings, which are incorporated in and constitute a part of the specification, illustrate embodiments of the invention and together with the description, serve to explain the principles of the invention.

DETAILED DESCRIPTION OF THE PREFERRED EMBODIMENTS

Figure 1:
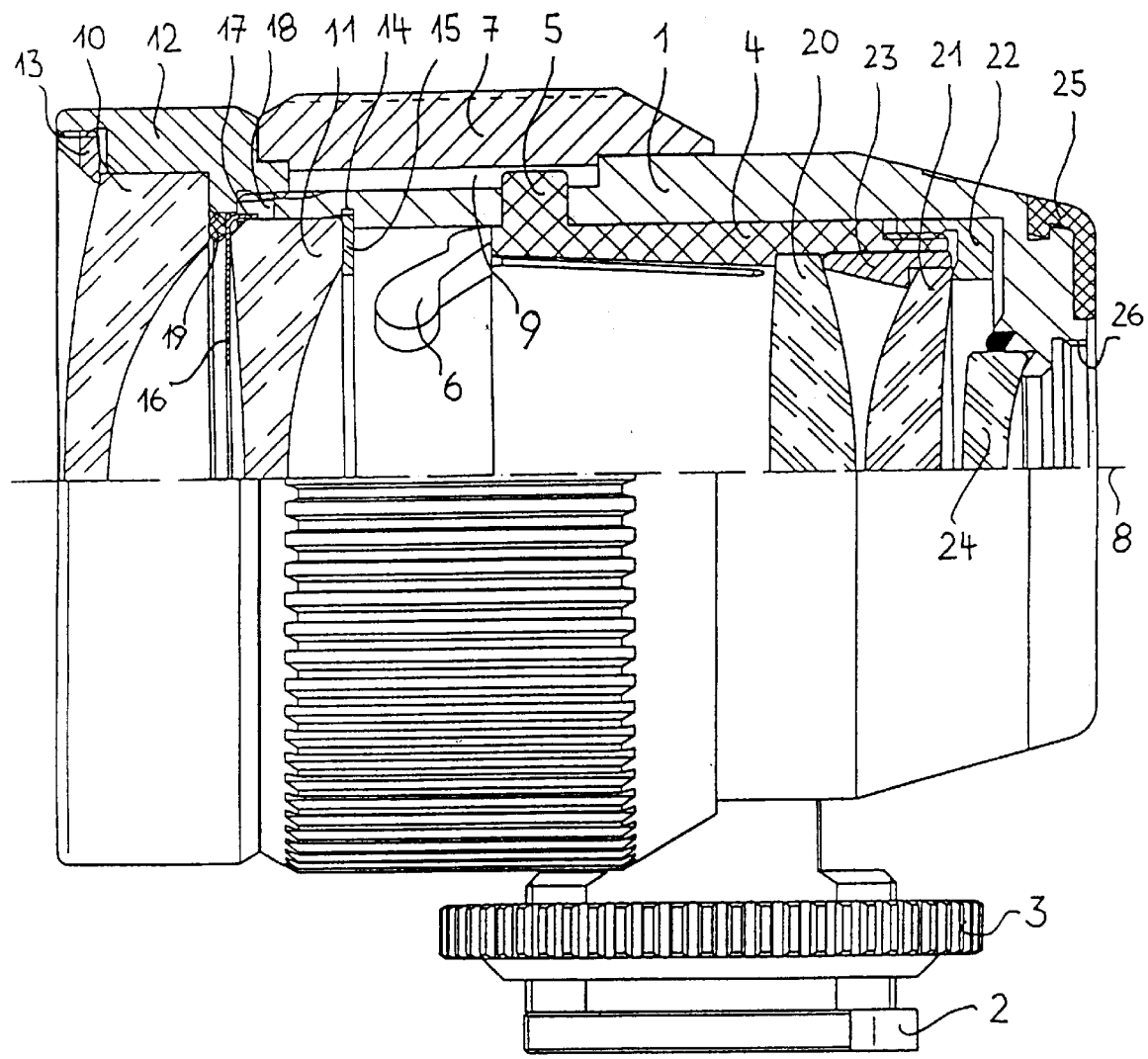
FIG. 1 shows a variable viewfinder in side view and partially sectioned.

Before turning to a description of the invention with respect to the figures, it is to be understood that the phrase "lens unit" as used herein means at least one lens. For example, the third lens unit described herein includes only one lens whereas each of the first and second lens units may include more than one lens. However, it should be readily understood that the third lens unit may include more than one lens and that either or both of the first and second lens units could be adapted to comprise only one lens.

The invention provides a variable viewfinder for cameras which can be produced favorably, in terms of cost, as a compact push-on viewfinder having a constant overall length.

The variable viewfinder according to the invention is distinguished by the fact that the first and third lens units are fixed in the telescope housing. Given a good overall imaging performance, only the second lens unit needs to be displaced to change the magnification. In this case, the focal lengths of the individual lens units are preferably selected so that the diopter of the overall system, over the entire focusing range, lies in a range from −0.5 to −1.0, a range which a normal-sighted, human eye can easily accommodate. The sole displacement of the second lens unit permits the use of a variator with a simple cylinder guide in the telescope housing and conventional pin/slit adjustment via an outer rotating ring. By means of local sliding surfaces on its outer lateral surface, the cylinder guide of the variator can be optimally adjusted to the radius of the inner cylinder surface of the telescope housing.

As the second lens unit, when being adjusted, moves in the vicinity of the third lens unit, the variator can be split functionally into a head region with a holder for the lens unit and a rear region for transmitting the adjustment. It is particularly advantageous for the production and assembly to have the guide pins be integrally formed on resilient tongues of the variator. These tongues can be pressed inward upon insertion of the variator into the telescope housing; the guide pins then automatically clamp under spring tension into guide tracks (after suitable alignment).

The design of the resilient tongues requires a certain length to prevent breakage of material or any material deformation which could occur upon compression. This length is a function of the free space present between the fixed lens units and the required displacement path. However, the length is also influenced by spring travel, which is a function of the height of the integrally formed guide pins. For the height of the guide pins, and thus the spring travel, to be kept small, the wall thickness of the telescope housing must be selected to be as thin as possible without impairing the stability of the cylinder. A thin wall thickness is also advantageous for the distance of the optical axis of the push-on viewfinder from the camera viewfinder. However, a thin wall thickness is disadvantageous for providing reliable support to a lens of the first lens unit. However, as later described in detail, it is possible, by inserting a flat snap ring into a groove in the wall of the telescope housing, to create the required supporting surface without impairing the free space for the displacement of the variator.

If the first lens unit comprises two lenses, the second of the two lenses can, when inserted into the cylinder of the telescope housing, render it possible to fix the orientation of a mask between the two lenses. The mask may limit the field of view with a position-determining nose which can engage a cutout provided on the telescope housing, thereby ensuring an exact alignment of the mask.

A spring-loaded ball latch, acting between the rotating ring and adaptor, permits selected viewfinder magnifications that are assigned to specific lens focal lengths. The selected magnifications can be set in a way that can be both felt and heard (e.g., by an audible "click" heard when the spring-load ball latch snaps into a groove in the rotating ring). In addition, supplementary lenses can be inserted, for example for diopter equalization, via a holder fitted on the telescope housing, i.e. screw thread, downstream of the third lens unit in the light direction.

Reference will now be made in detail to the present preferred embodiments of the invention, examples of which are illustrated in the drawings. Wherever possible, the same reference numbers will be used throughout the drawings to refer to the same or like parts.

The variable viewfinder illustrated in FIG. 1 comprises a telescope housing 1 that is provided with an adaptor 2. The adaptor 2 is shaped so that it can be inserted into a conventional flash shoe on a camera and be secured with the aid of a knurled ring 3. A cylindrical variator 4 can be displaceably inserted into the telescope housing 1. At one end of the variator 4, there is provided an integrally formed guide pin 5. The latter engages a curved track 6, which is milled into the telescope housing 1, as later described in detail.

Pushed onto the telescope housing 1 is a rotating ring 7 that contains an internal longitudinal groove 9 running parallel to the longitudinal axis 8 of the telescope housing 1. The guide pin 5 also engages in this longitudinal groove 9. Upon rotation of the rotating ring 7, the guide pin 5 is driven along the longitudinal groove 9 and along the curved track 6. This results in the displacement of the variator, 4 within the telescope housing 1, in the direction of the longitudinal axis 8.

The first lens unit comprises two lenses 10, 11 of negative refractive power. The lens 10 is held by a screw ring 13 in a lens barrel 12 screwed onto the telescope housing 1. The lens barrel 12 also secures the rotating ring 7. The lens 11 is inserted into the telescope housing 1. Because of the small wall thickness, it is not possible to mill, into the telescope housing 1, a sufficiently reliable support for the lens 11. To provide the necessary support for the lens 11, a groove 14 is formed circumferentially around the inner surface of the telescope housing 1. The lens 11 snaps into this groove 14 via a snap ring 15 projecting from the lens 11; the snap ring 15 is sized to fit in the groove 14.

A mask 16 limiting the image field is inserted between the lenses 10, 11. The position of the mask 16, with respect to rotation about the longitudinal axis 8, is determined by a nose 17 integrally formed on the mask 16 and by a cutout 18 at the end face in the telescope housing 1. The outside diameter of the mask 16 is adapted to fit in the inside diameter of the lens barrel 12. After the lens barrel 12 has been screwed onto the telescope housing 1, the mask 16 is laid into the lens barrel 12 and is centered with respect to the longitudinal axis 8. The mask 16 is firmly held in place by an elastic ring 19 placed thereon which, in turn, is covered by the lens 10 which is inserted and tightly screwed into the barrel 12.

The second lens unit, likewise comprising two lenses 20, 21, is inserted into the head side of the variator 4. The two lenses 20, 21 are held and positioned relative to one another by a retaining ring 22 and a spacer ring 23.

The third lens unit comprises a lens 24 which is positioned, in a holder, in the light exit end of the telescope housing 1. The telescope housing 1 has a rubber cap 25 as spectacle guard on the viewing side. Also provided is a holder with a screw thread 26 into which it is possible, for example, to insert a supplementary lens for diopter equalization.

Figure 2:
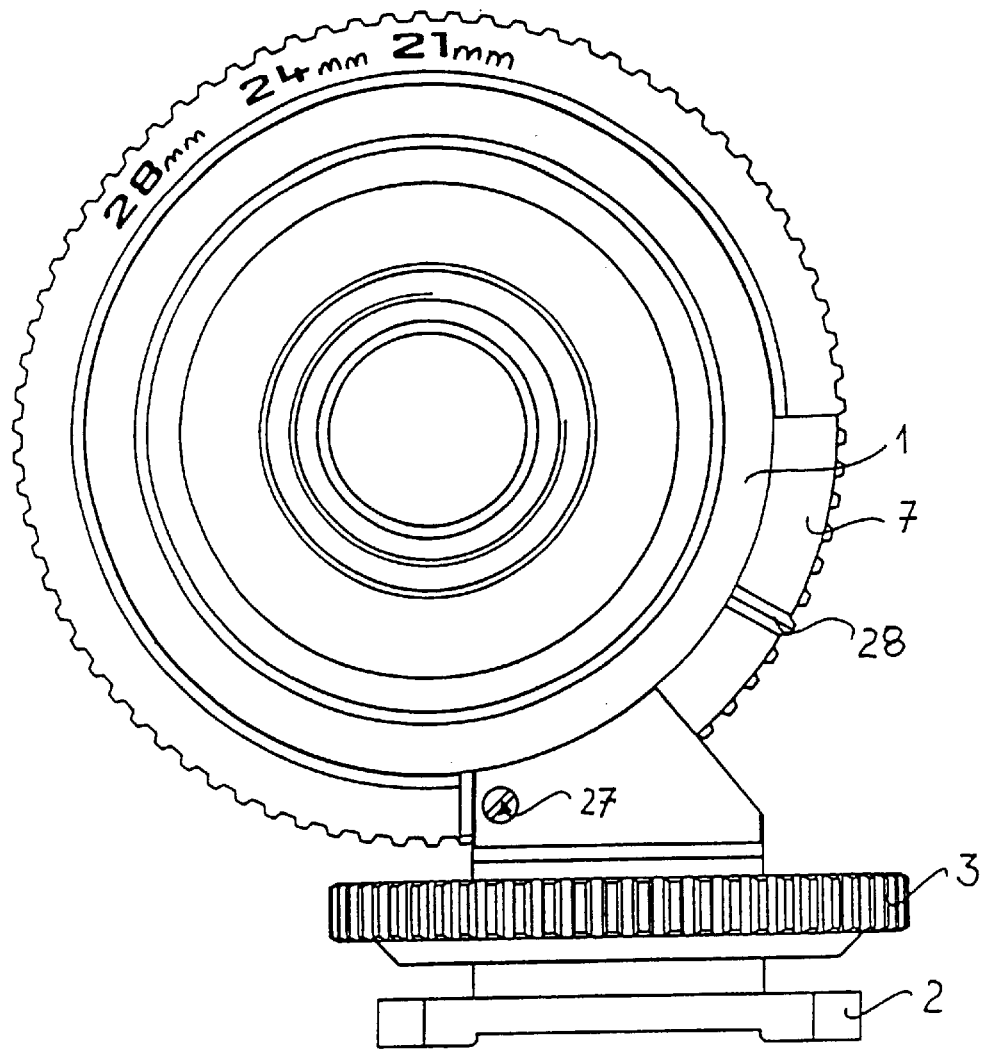
FIG. 2 shows a plan view of the variable viewfinder on the eyepiece side.
Figure 3:
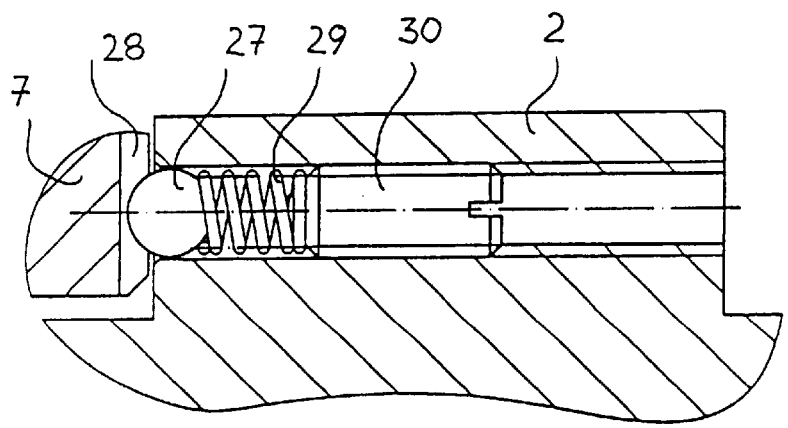
FIG. 3 shows a sectional illustration of the ball latch.

FIG. 2 shows a plan view on the eyepiece side. To achieve a better correspondence with the optical axis of the camera bayonet and/or the lenses, the telescope housing 1 is offset from the central axis of the adaptor 2. Inserted into the adaptor 2 is a resilient ball latch 27 which engages in latching notches 28 provided on the rotating ring 7 at the end face. The latching notches are, for example, assigned to the lens focal lengths of 21, 24 and 28 mm. FIG. 3 shows a sectional illustration of the ball latch. The strength of the latching can be set by the pressure of the spring 29 via a threaded pin 30.

Figure 4:
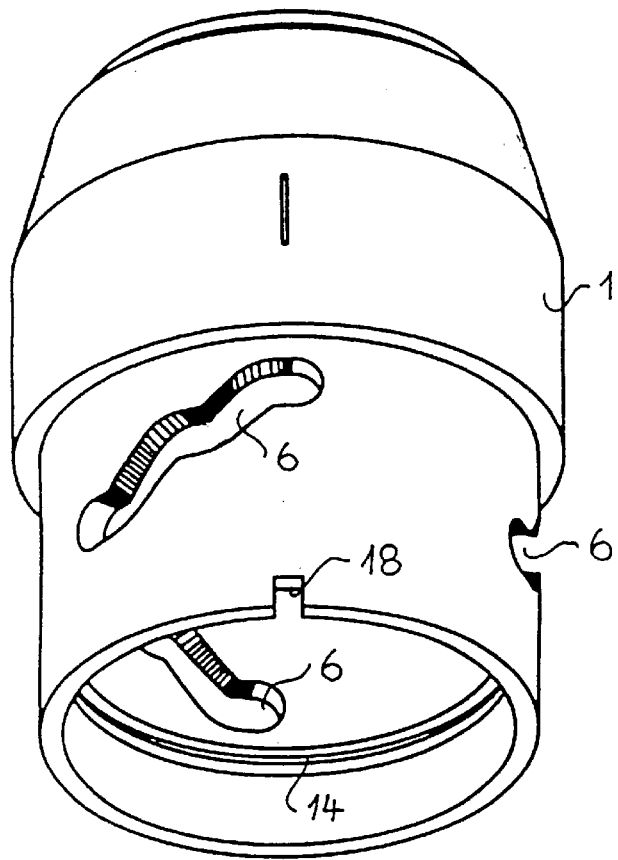
FIG. 4 shows a perspective view of the telescope housing.

A perspective view of the telescope housing 1 is shown in FIG. 4. Three curved tracks 6 situated symmetrically relative to one another are provided for guiding the variator 4. The cutout 18, for orienting the position of the mask 16, is provided at the rear end face of the telescope housing 1. The groove 14, for holding the snap ring 15, is in the inner cylinder surface. One end of each of the curved tracks 6 is positioned close to the groove 14 such that the adjusting path for the variator 4 is utilized optimally.

Figure 5:
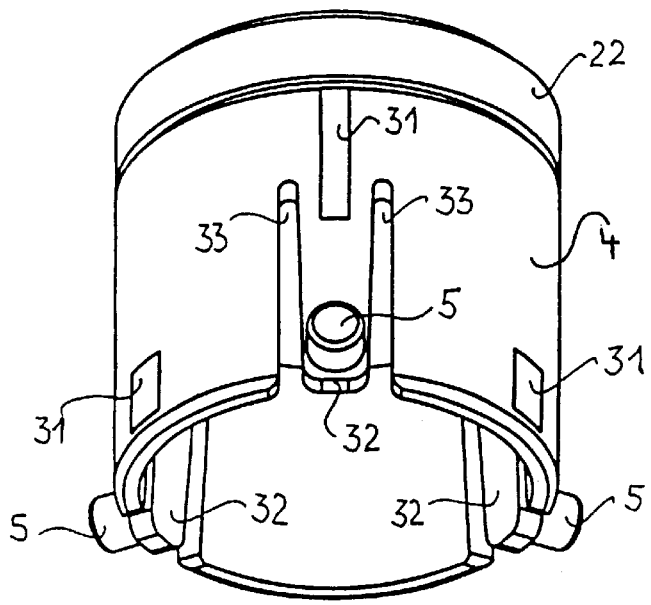
FIG. 5 shows a perspective view of the variator.

FIG. 5 shows the variator 4 in a perspective view with retaining ring 22 screwed on. A plurality of sliding surfaces 31 are arranged, in a mutually offsetting fashion, on the outer cylinder surface of the variator 4. Each of the three curved tracks 6 of the telescope housing 1 is correspondingly associated with a guide pin 5 which is integrally formed on one of the three tongues 32 of the variator 4. The tongues 32 are formed by two slit-shaped incisions 33 in the direction of the variator's longitudinal axis. The tongues 32 are preferably of trapezoidal design and the guide pins 5 are preferably integrally formed on the short side of the trapezoids, as shown.

To assemble the variable viewfinder, the variator 4, fitting with lenses 20, 21, is pushed into the telescope housing 1 which, in turn, is fitted with lens 24. As the variator 4 is inserted into the telescope housing 1, the tongues 32 of the variator 4 bend inward toward the longitudinal axis 8 thereby allowing the pins (which would otherwise abut the telescope housing 1) to slide into the telescope housing 1. When the variator 4 is sufficiently pushed into the telescope housing 1, the pins 5 will snap into the curved tracks 6 (if the variator 4 is properly oriented with respect to the telescope housing 1, by rotating the variator 4). The rotating ring 7 is then pushed onto the telescope housing 1 so that the longitudinal grooves 9 run over the guide pins 5. By screwing the lens barrel 12 onto the telescope housing 1, the rotating ring 7 is rotatably maintained on the telescope housing 1. Thereafter, the snap ring 15, the lens 11, the mask 16, the elastic ring 19 and the lens 10 can be pressed onto their respective supports and secured in the telescope housing 1 by the screw ring 13. The variable viewfinder, therefore, consists of a minimum of parts and can be easily mounted to a camera. Moreover, the optically active parts automatically center themselves as the parts are assembled. In addition, the overall length of the viewfinder remains constant while the magnification thereof is changed.

It will be apparent to those skilled in the art that various modifications and variations can be made to the disclosed preferred embodiments of the present invention without departing from the scope or spirit of the invention. Accordingly, it should be understood that the apparatus and method described herein are illustrative only and are not limiting upon the scope of the invention, which is indicated by the following claims.

What is claimed is:

1. A viewfinder having a variable magnification comprising:
   a telescope housing having an axis defining a light direction, the telescope housing comprising at least one curved groove;
   a rotating ring comprising at least one longitudinal groove which is substantially parallel to the axis, the rotating ring being rotatably positioned around the telescope housing;
   a variator comprising at least one guide pin, the variator being journalled within the telescope housing and adapted to move within the telescope housing in the direction of the axis;
   a first lens unit;
   a second lens unit;
   a third lens unit,
wherein the first, second, and third lens units are positioned in the telescope housing, wherein the first and third lens units are fixed with respect to the telescope housing, wherein the second lens unit is provided in the variator and is adapted to move with respect to the first and third lens units along the longitudinal axis to change the magnification of the viewfinder, and wherein at least one of said at least one guide pin projects through at least one of said at least one curved groove and extends into at least one of said at least one longitudinal groove.

2. The viewfinder according to claim 1, further comprising:

a mask, wherein the first lens unit comprises a first lens and second lens, and wherein the mask is provided between the first and second lenses of the first lens unit.

3. The viewfinder according to claim 2, wherein the mask includes a position-determining nose that is adapted to engage a cutout in the telescope housing.

4. The viewfinder according to claim 2, wherein the second lens of the first lens unit rests on a snap ring inserted in a circumferential groove in the telescope housing.

5. The viewfinder according to claim 2, wherein the mask is adapted to limit an image field of the viewfinder.

6. The viewfinder according to claim 1, wherein the telescope housing is a cylinder which is open at one end thereof, and wherein the open end of the housing is adapted to receive light traveling along the axis.

7. The viewfinder according to claim 6, wherein the open end of the telescope housing comprises a holder which maintains the orientation of third lens unit with respect to the telescope housing.

8. The viewfinder according to claim 6, wherein the variator is made out of an elastomeric material, and wherein a holder, which maintains the orientation of the second lens unit with respect to the variator, is provided on a head side of the variator.

9. The viewfinder according to claim 8, wherein a rear side of the variator comprises at least one tongue, and wherein at least one of said at least one guide pin projects from at least one of said at least one tongue in a direction radially away from the axis.

10. The viewfinder according to claim 9, wherein at least one of the at least one guide pin and at least one of the at least one tongue are integrally formed.

11. The viewfinder according to claim 9, wherein sliding surfaces are arranged on an outer surface of the variator.

12. The viewfinder according to claim 8, wherein the elastomeric material is an injection-molded plastic.

13. The viewfinder according to claim 6, wherein the telescope housing includes a holder adapted to receive a supplementary lens.

14. The viewfinder according to claim 1, wherein the focal lengths of the three lens units are such that a diopter of the viewfinder, over a focusing range, lies in a range that a human eye can accommodate.

15. The viewfinder according to claim 14, wherein the diopter of the viewfinder, over the focusing range, is between −0.5 and −1.0.

16. The viewfinder according to claim 1, wherein the first lens unit has a negative refractive power in the light direction, wherein the second lens unit has a positive refractive power in the light direction, and wherein the third lens unit has a negative refractive power in the light direction.

17. The viewfinder according to claim 1, wherein the telescope housing further comprises an adapter, and wherein the adapter is adapted to fit in a shoe of a camera.

18. The viewfinder according to claim 17, wherein the adapter comprises a ball latch, and wherein the rotating ring includes latching notches which are adapted to engage releaseably the ball latch.

* * * * *